US009841823B2

(12) United States Patent
Glueck et al.

(10) Patent No.: US 9,841,823 B2
(45) Date of Patent: *Dec. 12, 2017

(54) PHYSICAL OBJECT FOR INTUITIVE NAVIGATION IN A THREE-DIMENSIONAL SPACE

(71) Applicant: AUTODESK, Inc, San Rafael, CA (US)

(72) Inventors: Michael Glueck, Toronto (CA); Azam Khan, Aurora (CA); Sean Anderson, Mississauga (CA)

(73) Assignee: AUTODESK, INC., San Rafael, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/817,152

(22) Filed: Aug. 3, 2015

(65) Prior Publication Data
US 2015/0339029 A1 Nov. 26, 2015

Related U.S. Application Data

(63) Continuation of application No. 13/083,435, filed on Apr. 8, 2011, now Pat. No. 9,098,115.

(51) Int. Cl.
G06F 3/0481 (2013.01)
G06F 3/01 (2006.01)
(Continued)

(52) U.S. Cl.
CPC .............. *G06F 3/017* (2013.01); *G06F 3/038* (2013.01); *G06F 3/0346* (2013.01);
(Continued)

(58) Field of Classification Search
CPC ........ G06F 3/011; G06F 3/0481; G06F 3/017; G06F 3/0346; G06F 3/04815; G06F 3/03543
(Continued)

(56) References Cited

U.S. PATENT DOCUMENTS 5,877,748 A * 3/1999 Redlich .................. G06F 3/011
345/159
8,965,729 B2 * 2/2015 Bang ..................... G06F 3/0317
702/141

(Continued)

OTHER PUBLICATIONS

Fiala, "ARTag, a fiducial marker system using digital techniques", In Proc. CVPR'05, vol. 2, 2005, pp. 590-596.
(Continued)

*Primary Examiner* — Abbas Abdulselam
(74) *Attorney, Agent, or Firm* — Artegis Law Group, LLP

(57) ABSTRACT

A computer-implemented method for manipulating graphics objects within a display viewed by an end-user is disclosed. The method involves: receiving motion information generated in response to the end-user moving an object that is external to the display; determining at least one zone of motion in which the end-user moves the object; determining a first motion type associated with the movement of the object within the at least one zone of motion; and based on the at least one zone of motion and the first motion type, determining at least one change to a viewpoint associated with one or more graphics objects displayed to the end-user within the display. The at least one change to the viewpoint causes an alteration in how the one or more graphics objects are displayed to the end-user within the display.

20 Claims, 4 Drawing Sheets

(51) Int. Cl.
*G06F 3/042* (2006.01)
*G06F 3/0354* (2013.01)
*G06F 3/038* (2013.01)
*G06F 3/0346* (2013.01)

(52) U.S. Cl.
CPC ........ *G06F 3/03543* (2013.01); *G06F 3/0425* (2013.01); *G06F 3/04815* (2013.01)

(58) Field of Classification Search
USPC ........................................ 345/173, 156, 163
See application file for complete search history.

(56) References Cited

U.S. PATENT DOCUMENTS 9,098,115 B2* 8/2015 Glueck .............. G06F 3/04815

2006/0287086 A1* 12/2006 Zalewski ................ A63F 13/00
463/37
2008/0070684 A1* 3/2008 Haigh-Hutchinson . A63F 13/04
463/32
2009/0073132 A1* 3/2009 Lee ....................... G06F 3/0481
345/173

OTHER PUBLICATIONS

Hinckley, et al., "A survey of design issues in spatial input", ACM UIST, 1994, pp. 213-222.
Kato, et al., "Virtual object manipulation on a table-top AR environment", In Proc. ISAR'00, 2000, pp. 111-119.
Khan, et al., "ViewCube: a 3D orientation indicator and controller", In Proc. I3D'08, 2008, pp. 17-25.
Woods, et al., "MagicMouse: an inexpensive 6-degree-of-freedom mouse", In Proc., GRAPHITE '03, 2003, pp. 285-286.
Zhai, "Human performance in six degree of freedom input control", Ph.D. Thesis, University of Toronto, 1995.

* cited by examiner

| Type of Zone | Type of Motion | Resulting Viewpoint Change |
|---|---|---|
| Zone of Rotation 410 | Rotation of the object in a clockwise/ counterclockwise direction 412 | Rotation of the viewpoint in a clockwise/ counterclockwise direction 414 |
| Panning Zone 420 | Translation of the object in a first direction 422 | Translation of the viewpoint in a direction corresponding to the first direction 424 |
| Zooming Zone 430 | Translation of the object toward/away from a first position 432 | Zooming into/out of the graphics object 434 |
| Resting Zone 440 | Any movement 442 | None 444 |

Figure 4

PHYSICAL OBJECT FOR INTUITIVE NAVIGATION IN A THREE-DIMENSIONAL SPACE

CROSS-REFERENCE TO RELATED APPLICATIONS

This application is a continuation of the co-pending U.S. patent application titled, "PHYSICAL OBJECT FOR INTUITIVE NAVIGATION IN A THREE-DIMENSIONAL SPACE," filed on Apr. 8, 2011 and having Ser. No. 13/083,435. The subject matter of this related application is hereby incorporated herein by reference.

BACKGROUND OF THE INVENTION

Field of the Invention

The present invention relates generally to navigating a three-dimensional space and, more specifically, to a physical object for intuitive navigation in a three-dimensional space.

Description of the Related Art

Several different techniques for manipulating the viewpoints needed to view one or more three-dimensional (3D) graphics objects displayed to an end-user within a display are known in the art. For example, in one implementation, an end-user may employ the drag-and-drop function of a mouse to rotate a viewpoint within the display. Here, the end-user clicks arrows provided on the screen to zoom or pan the viewpoint. In another implementation, a virtual cube may be presented to the end-user in a corner of the display. To rotate the viewpoint, the end-user employs the mouse to rotate the virtual cube. Other implementations similarly involve a user employing a mouse, keyboard and/or touch screen to enter commands to manipulate viewpoints used to view the graphics objects within the display.

One drawback of these different approaches to manipulating the viewpoints of graphics objects within a display is that the approaches are not intuitive to the end-user. As a consequence, the end-user must invest an excessive amount of time into thinking and planning the steps that she would take to manipulate the 3D space to reach her desired final viewpoint and/or final graphics object state. In addition, manipulating the viewpoint in an indirect fashion using a mouse and keyboard is oftentimes cumbersome and frustrating to the end-user.

As the foregoing illustrates, what is needed in the art is a more intuitive way for end-users to manipulate and view graphics objects within a display.

SUMMARY OF THE INVENTION

One embodiment of the present invention sets forth a method for manipulating graphics objects within a display viewed by an end-user. The method includes the steps of: receiving motion information generated in response to the end-user moving an object that is external to the display; determining at least one zone of motion in which the end-user moves the object; determining a first motion type associated with the movement of the object within the at least one zone of motion; and based on the at least one zone of motion and the first motion type, determining at least one change to a viewpoint associated with one or more graphics objects displayed to the end-user within the display. The at least one change to the viewpoint causes an alteration in how the one or more graphics objects are displayed to the end-user within the display.

One advantage of the disclosed method is that the method provides a more intuitive technique for navigating within a 3D space on a screen. Specifically, the method provides intuitive techniques for the end-user to rotate, translate or zoom into or out of one or more graphics objects within a display.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments:

FIG. 4 is a table illustrating changes that may be made to the viewpoints of one or more graphics objects within a display based on the type of motion of an object external to the display within a particular type of zone of motion, according to one embodiment of the present invention.

DETAILED DESCRIPTION

Figure 1:
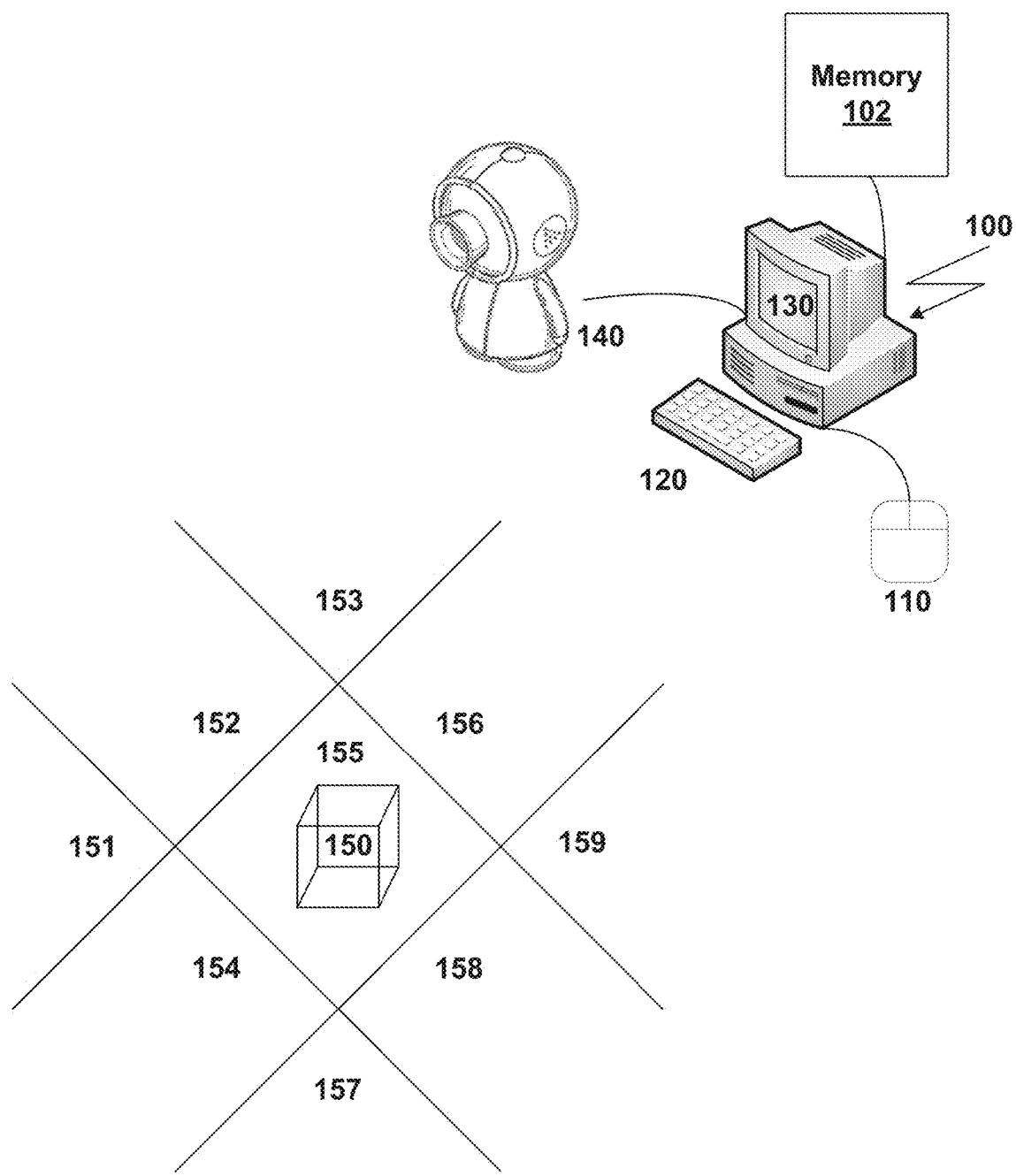
FIG. 1 illustrates a computer system configured to implement one or more aspects of the present invention.

FIG. 1 illustrates a computer system 100 configured to implement one or more aspects of the present invention, according to one embodiment. As shown, the computer system 100 includes a memory 102, a mouse 110, a keyboard 120, a display 130, a camera 140, and an object 150 external to the display within one zone of motion 155 of a plurality of zones of motion 151-159.

The memory 102 is configured to store software programs that run on computer system 100. A more detailed description of the function of various systems stored in the memory 102 is provided in conjunction with FIG. 2 below.

The mouse 110 is configured to allow the end-user to navigate across a two-dimensional display screen such as display 130. The mouse is connected to the main body of computer system 100 by a wired or wireless connection. In another embodiment (not illustrated), a touch screen device may replace the functionality of the mouse.

The keyboard 120 is configured to allow the end-user to press keys and to type data into the computer system 100. The keyboard is connected with the main body of computer system 100 via a wired or wireless connection. In another embodiment (not illustrated), the keyboard may be displayed on the screen.

The display 130 is configured to display data to the user. The display is also connected to the main body of the computer system 100 via a wired or wireless connection. In one embodiment, the display is a computer monitor or screen. The display could be a plasma display, a liquid crystal display (LCD) or any other type of display that is known in the art.

The camera 140 is also connected with the main body of computer system 100 via a wired or wireless connection. The camera 140 is configured to receive image or light data external to the computer system 100 and provide the image or light data to memory 102 for further processing. One skilled in the art would appreciate that the camera 140 could be a webcam or a photo/video camera.

The object 150 external to the display 130 is configured to be viewed by the camera. In one embodiment, object 150 external to the display is a hand-held cube having a size and weight that is suitable for manual rotation by an end-user. However, those skilled in the art would appreciate that an object of any shape and size could be used to implement the techniques described herein. In one embodiment, the object 150 is a cube, and each face of the cube includes a distinct visual mark or pattern, such that an image of each face generated by camera 140 could be recognized by a software program running in memory 102.

According to one embodiment, the object 150 is located within one of a plurality of zones of motion 151-159. Each zone of motion specifies an expected type of motion in which the object 150 may be engaged when located in the zone 151-159. Several exemplary zones of motion are discussed in conjunction with FIG. 4 below.

Figure 2:
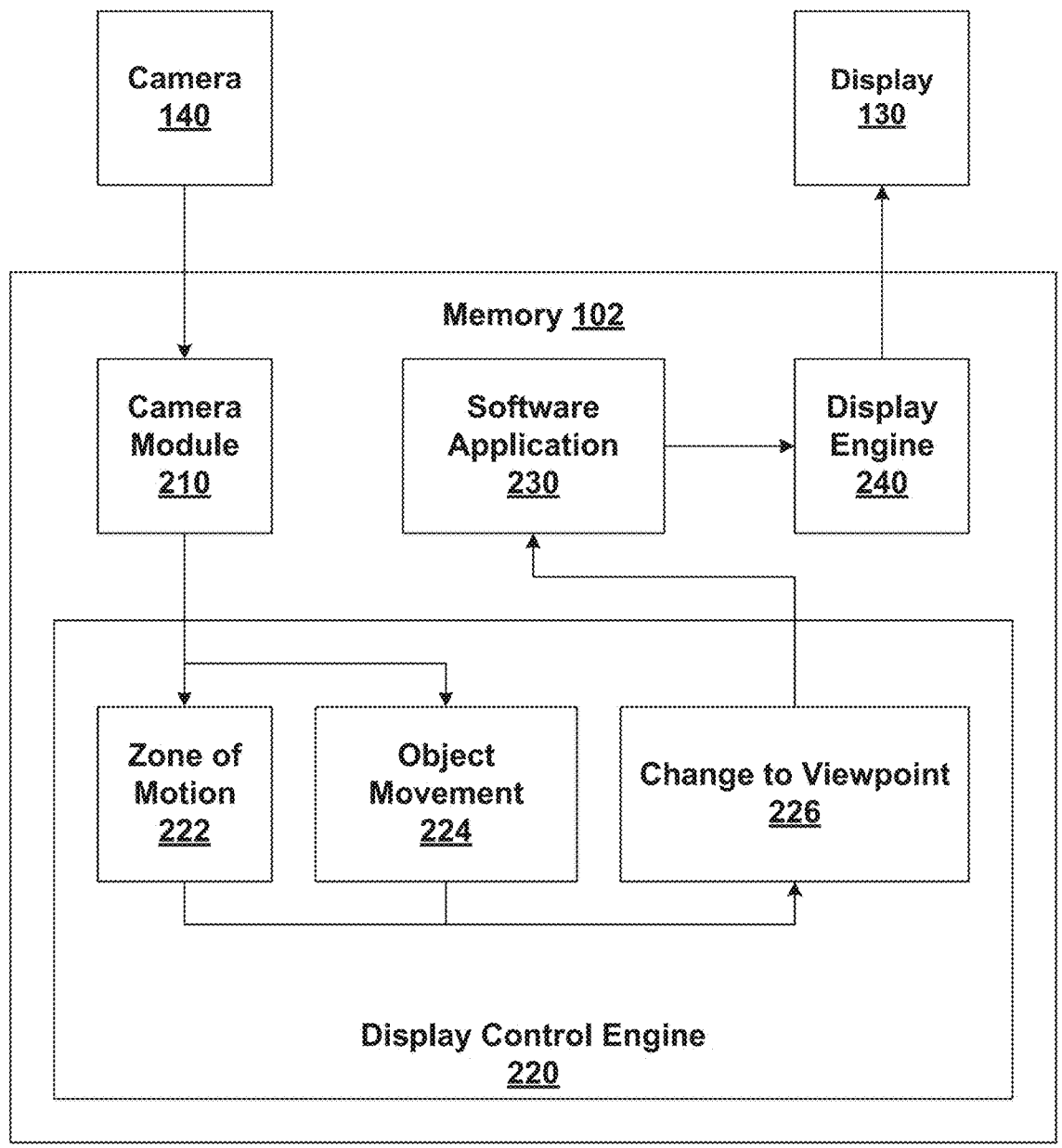
FIG. 2 is a more detailed illustration of logic implemented by the computer system of FIG. 1, according to one embodiment of the present invention.

FIG. 2 illustrates the memory 102 of the computer system 100 in more detail, according to one embodiment. As shown, the memory 102 includes a camera module 210, a display control engine 220, a software application 230, and a display engine 240.

The camera module 210 receives video data from camera 140. The camera 210 then provides this video data to the display control engine 220 for further processing. In one embodiment, the camera module is a driver for the camera.

The display control engine 220 receives the video data from the camera module 210. The display control engine 220 then identifies an object in the video data as the object 150 for controlling the display. The display control engine 220 then determines a zone of motion 222 and an object movement 224 of the object 150. The zone of motion 222 represents one of zones 151-159 of FIG. 1, which could correspond to various types of zones, such as a zone of rotation, a panning zone, a zooming zone, a resting zone, or a zone associated with any other type of movement that is known in the art. The object movement 224 could be, without limitation, a rotation of the object 150, a translation of the object 150 in a first direction, a translation of the object 150 toward or away from a first position or any other type of movement known in the art. Optionally, one zone, such as zone 155, is designated as a resting zone, and movements of the object 150 within the resting zone are ignored. The display control engine 220 then calculates a change to a viewpoint for a graphics object that is being displayed in display 130 based on the zone of motion 222 and the object movement 224. Exemplary correspondences between the zone of motion 222, object movement 224, and change to viewpoint 226 are discussed in greater detail below in conjunction with FIG. 4.

The change to the viewpoint 226 is provided to a software application 230. Software application 230 then adjusts the information to be presented on the display 130 and provides the adjusted information to display engine 240. One skilled in the art would appreciate that software application 230 could be a computer-aided design (CAD) application, a 3D image viewing application, a video gaming application or any other type of application that presents images to an end-user. In one embodiment, the software application 230 is a general purpose application, such as a web browser. In another embodiment (not illustrated) the display control engine 220 is a part of the software application 230.

The display engine 240 receives data from the software application 230 and serves to modify the data presented on the display 130. In one embodiment, the display engine 240 is a driver for a computer monitor.

Figure 3:
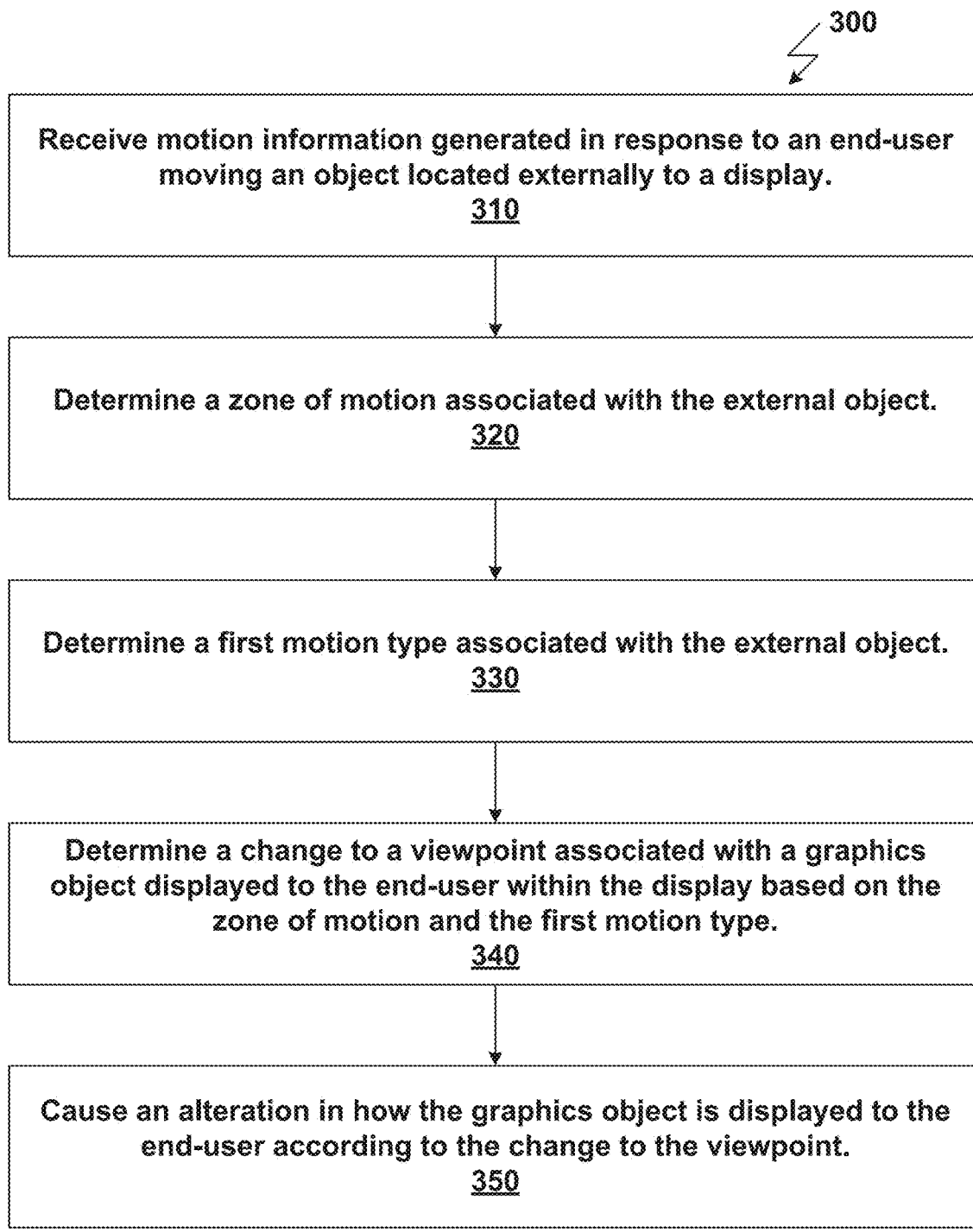
FIG. 3 is a flow diagram of method steps for manipulating one or more graphics objects within a display, according to one embodiment of the present invention.

FIG. 3 is a flow diagram of method steps for manipulating graphics objects within the display viewed by the end-user, according to one embodiment. Although the method steps are described in conjunction with FIGS. 1-2, persons skilled in the art would understand that any system configured to perform the method steps, in any order, falls within the scope of the present invention.

The method 300 begins at step 310, where the display control engine 220 receives motion information generated in response to an end-user moving an object 150 located externally to the display 130. In one embodiment, the motion information is provided to the display control engine 220 by the camera module 210.

In step 320, the display control engine 220 determines a zone of motion 222 associated with the external object 150 based on the motion information. In one embodiment, the zone of motion is one of zones 151-159.

In step 330, the display control engine 220 determines a motion type associated with the external object 150 based on the motion information. In one embodiment, the motion type is an object movement 224. One skilled in the art would understand that the object movement 224 could be a rotation of the object, a translation of the object or any other movement.

In step 340, the display control engine 220 determines a change to a viewpoint 226 associated with one or more graphics objects displayed to the end-user via the display 130 based on the zone of motion 222 and the first motion type (object movement 224). One possible correspondence between type of zone, type of motion, and resulting viewpoint change, which may be implemented by display control engine 220, is illustrated in FIG. 4 and described in detail below. However, those skilled in the art would understand that other correspondences between type of zone, type of motion, and resulting viewpoint change also fall within the scope of the invention.

In step 350, the display control engine 220 causes an alteration in how the one or more graphics objects are displayed to the end-user in the display 130 according to the change to the viewpoint 226. In one embodiment, the display control engine 220 provides the change to the viewpoint to a software application 230, such as a 3D viewing program or a computer-aided design program, which provides the updated viewing data to the display engine 240. In another embodiment, the display control engine provides the change in the viewpoint directly to the display engine 240. The display engine then modifies the view displayed on display 130.

FIG. 4 is a table 400 illustrating changes to the viewpoint determined based on the type of zone and the type of motion, according to one embodiment. While one specific mapping of type of zone and type of motion to a resulting viewpoint change is illustrated in FIG. 4, those skilled in the art would understand that multiple different mappings and/or correspondences between type of zone, type of motion, and resulting viewpoint change may be implemented in conjunction with the techniques described herein. According to one embodiment, the type of zone is stored in zone of motion 222, the type of motion is stored in object movement 224, and the resulting viewpoint change is stored in change to viewpoint 226.

According to the first row of table 400, the type of zone is a zone of rotation 410, and the type of motion is a rotation of the object 150 in a clockwise direction 412. One skilled in the art would recognize that, according to one embodiment, the zone of rotation 410 corresponds to one of the zones 151-159 of FIG. 1. The resulting viewpoint change is a rotation of the viewpoint in a clockwise direction 414. Alternatively, the type of motion 412 is a rotation of the object 150 in a counterclockwise direction and the resulting viewpoint change is a rotation of the viewpoint in a counterclockwise direction 414.

According to the second row of table 400, the type of zone is a panning zone 420, and the type of motion is a translation of the object 150 in a first direction 422. One skilled in the art would recognize that, according to one embodiment, the panning zone 420 corresponds to one of the zones 151-159 of FIG. 1. The resulting viewpoint change is a translation of the viewpoint in a direction corresponding to the first direction 424. For example, if the object 150 is translated to the right, the viewpoint of the one or more graphics objects presented on display 130 would also be translated to the right.

According to the third row of table 400, the type of zone is a zooming zone 430, and the type of motion is a translation of the object 150 toward a first position 432. One skilled in the art would recognize that, according to one embodiment, the zooming zone 430 corresponds to one of the zones 151-159 of FIG. 1. According to one embodiment, the first position is either a position of the camera or an expected position of the end-user. However, those skilled in the art would immediately realize that other first positions may be used in conjunction with the techniques described herein. The resulting viewpoint change is a zooming into the one or more graphics objects 434. Alternatively, the type of motion is a translation of the object 150 away from the first position 432, and the resulting viewpoint change is a zooming out of the one or more graphics object 434.

According to the fourth row of table 400, the type of zone is a resting zone 440, and the type of motion is any movement 442. There is no resulting viewpoint change 444, as all movements of the object 150 within the resting zone are ignored. One skilled in the art would understand that one purpose of the resting zone 440 is to allow the end-user to pick up and put down the object 150 without worrying about what effect this particular action would have on the viewpoint. One skilled in the art would recognize that, according to one embodiment, the resting zone 440 corresponds to one of the zones 151-159 of FIG. 1. In one embodiment, the resting zone includes a default resting place for object 150.

In sum, the disclosed approach provides a more user-friendly and intuitive way to manipulate graphics objects or viewpoints presented to an end-user within a display. More specifically, the approach applies to a display control engine that receives motion information generated in response to the end-user moving an external object from a camera module. The display control engine then determines a zone of motion associated with the external object and a first movement associated with the external object. Next, the display control engine determines a change to a viewpoint associated with a graphics object displayed to the end-user within the display based on the zone of motion and the first movement. The display control engine transmits this change to the viewpoint to a software application, which transmits the change to a viewpoint to a display engine. Finally, the display engine alters how the graphics object is displayed to the end-user according to the change to the viewpoint. In one embodiment, the zone of motion is a zone of rotation, the first movement is a rotation of the external object, and the determined change to the viewpoint is a change to the viewpoint. In another embodiment, the zone of motion is a zone of panning, the first movement is a panning of the external object, and the determined change to the viewpoint is a panning of the viewpoint. In yet another embodiment, the zone of motion is a zone of zooming, the first movement is a translation of the external object toward or away from a first position, and the determined change to the viewpoint is a zooming into or out from the graphics object.

One advantage of the disclosed approach is that an end-user can more easily and intuitively manipulate graphics objects within a display. In particular, the user can more easily zoom, pan, and rotate a viewpoint within the display. As a result, the end-user is able to save mental energy that would have been focused on manipulating the viewpoint and is instead able to focus on other tasks.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

The scope of the present invention is determined by the claims that follow.

What is claimed is:

1. A method implemented by a computer system for manipulating graphics objects within a display of the computer system viewed by an end-user, the method comprising:

capturing motion data associated with the end-user moving an inanimate object within a plurality of zones of motion, wherein the inanimate object is external to the display and is not an element of the computer system;

determining a zone of motion in the plurality of zones of motion in which the end-user moves the inanimate object;

determining a first motion type associated with the movement of the inanimate object within the zone of motion; and based on the zone of motion and the first motion type, determining at least one change to a viewpoint associated with one or more graphics objects displayed to the end-user within the display, wherein the at least one change to the viewpoint causes an alteration in how the one or more graphics objects are displayed to the end-user within the display.

2. The method of claim 1, further comprising transmitting the at least one change to the viewpoint to a software application that generates the one or more graphics objects displayed within the display.

3. The method of claim 1, further comprising transmitting the at least one change to the viewpoint to a display engine configured to manage how the one or more graphics objects are displayed within the display.

4. The method of claim 1, wherein the inanimate object external to the display comprises a hand-held cube.

5. The method of claim 4, wherein at least one face of the hand-held cube includes a distinct visual mark that identifies the at least one face of the hand-held cube and enables the first motion type associated with the movement of the cube within the at least one zone of motion to be determined.

6. The method of claim 1, wherein the at least one zone comprises a zone of rotation, the first motion type corresponds to a rotation of the inanimate object external to the display within the zone of rotation, and the at least one change to the viewpoint comprises a rotation of the viewpoint relative to the one or more graphics objects.

7. The method of claim 1, wherein the at least one zone comprises a panning zone, the first motion type corresponds to a translation of the inanimate object external to the display within the panning zone in a first direction relative to a first position, and the at least one change to the viewpoint comprises a translation of the viewpoint in a direction corresponding to the first direction relative to the one or more graphics objects.

8. The method of claim 1, wherein the at least one zone comprises a zooming zone, the first motion type corresponds to a translation of the inanimate object external to the display within the zooming zone toward or away from a first position, and the at least one change to the viewpoint comprises a zoom into or a zoom out from the one or more graphics objects.

9. A non-transitory computer-readable medium storing instructions that, when executed by a processor within a computer system, cause the processor to manipulate graphics objects within a display of the computer system viewed by an end-user, by performing the steps of:

capturing motion data associated with the end-user moving an inanimate object, wherein the inanimate object is external to the display and is not an element of the computer system;

determining a first motion type associated with the movement of the inanimate object; and based on the zone of motion and the first motion type, determining at least one change to a viewpoint associated with one or more graphics objects displayed to the end-user within the display, wherein the at least one change to the viewpoint causes an alteration in how the one or more graphics objects are displayed to the end-user within the display.

10. The computer-readable medium of claim 9, wherein the steps further comprise transmitting the at least one change to the viewpoint to a software application that generates the one or more graphics objects displayed within the display.

11. The computer-readable medium of claim 9, wherein the steps further comprise transmitting the at least one change to the viewpoint to a display engine configured to manage how the one or more graphics objects are displayed within the display.

12. The computer-readable medium of claim 9, wherein the inanimate object external to the display comprises a hand-held cube.

13. The computer-readable medium of claim 9, wherein at least one face of the hand-held cube includes a distinct visual mark that identifies the at least one face of the hand-held cube and enables the first motion type associated with the movement of the cube within the at least one zone of motion to be determined.

14. The computer-readable medium of claim 9, wherein the at least one zone comprises a zone of rotation, the first motion type corresponds to a rotation of the inanimate object external to the display within the zone of rotation, and the at least one change to the viewpoint comprises a rotation of the viewpoint relative to the one or more graphics objects.

15. The computer-readable medium of claim 9, wherein the at least one zone comprises a panning zone, the first motion type corresponds to a translation of the inanimate object external to the display within the panning zone in a first direction relative to a first position, and the at least one change to the viewpoint comprises a translation of the viewpoint in a direction corresponding to the first direction relative to the one or more graphics objects.

16. The computer-readable medium of claim 9, wherein the at least one zone comprises a zooming zone, the first motion type corresponds to a translation of the inanimate object external to the display within the zooming zone toward or away from a first position, and the at least one change to the viewpoint comprises a zoom into or a zoom out from the one or more graphics objects.

17. A system comprising:
a computer system configured to:
capture motion data associated with the end-user moving an inanimate object within a plurality of zones of motion, wherein the inanimate object is external to a display of the computer system and is not an element of the computer system;

determine a zone of motion in the plurality of zones of motion in which the end-user moves the inanimate object;

determine a first motion type associated with the movement of the inanimate object within the zone of motion; and based on the zone of motion and the first motion type, determine at least one change to a viewpoint associated with one or more graphics objects displayed to the end-user within the display, wherein the at least one change to the viewpoint causes an alteration in how the one or more graphics objects are displayed to the end-user within the display.

18. The system of claim 17, further comprising the inanimate object external to the display that comprises a hand-held cube, wherein at least one face of the hand-held cube includes a distinct visual mark that identifies the at least one face of the hand-held cube.

19. The system of claim 17, further comprising a camera configured to:
- capture the motion information related to the end-user moving the inanimate object that is external to the display; and
- provide the motion information to the computer system.

20. The system of claim 17, wherein the display is configured to display the one or more graphics objects from the viewpoint based on the at least one change to the viewpoint.

\* \* \* \* \*

UNITED STATES PATENT AND TRADEMARK OFFICE
CERTIFICATE OF CORRECTION

PATENT NO. : 9,841,823 B2
APPLICATION NO. : 14/817152
DATED : December 12, 2017
INVENTOR(S) : Michael Glueck, Azam Khan and Sean Anderson It is certified that error appears in the above-identified patent and that said Letters Patent is hereby corrected as shown below:

In the Claims

Column 7, Claim 9, Line 66, please delete "zone of motion and the".

Signed and Sealed this
Thirteenth Day of March, 2018

Andrei Iancu
*Director of the United States Patent and Trademark Office*